(12) United States Patent
Ji et al.

(10) Patent No.: US 7,933,584 B2
(45) Date of Patent: Apr. 26, 2011

(54) METHOD FOR IMPLEMENTING SECURITY UPDATE OF MOBILE STATION AND A CORRELATIVE REACTING SYSTEM

(75) Inventors: Changfeng Ji, Shenzhen (CN); Jiwei Wei, Shenzhen (CN); Shuling Liu, Shenzhen (CN); Zhibin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1105 days.

(21) Appl. No.: 11/580,591

(22) Filed: Oct. 13, 2006

(65) Prior Publication Data
US 2007/0088948 A1    Apr. 19, 2007

(30) Foreign Application Priority Data

| | | |
|---|---|---|
| Oct. 15, 2005 | (CN) | 2005 1 0100415 |
| Apr. 6, 2006 | (CN) | 2006 1 0034928 |
| Apr. 6, 2006 | (CN) | 2006 1 0034929 |
| Sep. 29, 2006 | (CN) | 2006 1 0141483 |

(51) Int. Cl.
*H04M 1/65* (2006.01)
*H04M 1/68* (2006.01)
*H04M 3/16* (2006.01)

(52) U.S. Cl. ........ 455/411; 455/410; 455/418; 455/419; 455/420; 455/423; 455/432.2; 455/432.3; 713/66; 713/182; 713/201

(58) Field of Classification Search .......... 713/66, 713/182, 201; 455/410–411, 418–420, 423, 455/432.2–432.3
See application file for complete search history.

(56) References Cited

U.S. PATENT DOCUMENTS

| | | | |
|---|---|---|---|
| 2003/0177389 A1* | 9/2003 | Albert et al. | 713/201 |
| 2004/0024878 A1 | 2/2004 | Makimoto et al. | |
| 2005/0055578 A1* | 3/2005 | Wright et al. | 713/201 |
| 2005/0198513 A1* | 9/2005 | Rodriguez et al. | 713/182 |
| 2005/0246767 A1* | 11/2005 | Fazal et al. | 726/11 |
| 2006/0248342 A1* | 11/2006 | Bajar et al. | 713/182 |
| 2007/0006282 A1* | 1/2007 | Durham et al. | 726/2 |

FOREIGN PATENT DOCUMENTS

CN    1529531    9/2004

(Continued)

OTHER PUBLICATIONS

Bertine, H., "ITU-T Security Standardization", Global Standards Collaboration GSC#10, Agenda Item:5.6, (Aug. 28-Sep. 2, 2005).

(Continued)

*Primary Examiner* — Kamran Afshar
*Assistant Examiner* — Khalid Shaheed
(74) *Attorney, Agent, or Firm* — Finnegan, Henderson, Farabow, Garrett & Dunner LLP (57) ABSTRACT

A correlative reacting system and a method for implementing security update of mobile station. The correlative reacting system includes a security correlative agent at a terminal side and a security correlative server at a network side communicated with the security correlative agent via an air interface. In the present invention, the correlative reacting system performs an information interaction with the mobile station, controls the mobile station to carry out an automatic security update. The automatic security update includes automatic downloading and installation, update of the security correlative agent, and automatic recovery of the insecurity factors of the mobile station and the like.

31 Claims, 5 Drawing Sheets

FOREIGN PATENT DOCUMENTS

| | | |
|---|---|---|
| CN | 100456882 | 1/2009 |
| JP | 2004-265304 | 9/2004 |
| WO | WO 03/017568 | 2/2003 |
| WO | 2004/057834 A | 7/2004 |

OTHER PUBLICATIONS

Xiaoning, L., "Mobile Ipv6 Security Mechanism for Binding Updates to Correspondent Nodes", China Academic Journal Electronic Publishing House (2004).

Liu, S., et al., "Correlative reacting system in mobile data communication," International Telecommunication Union, vol. Study Group 17, pp. 1-21 (Oct. 2005).

Liu, S., et al., "Updated draft text of X.crs:correlative reacting system in mobile data communication", International Telecommunication Union, vol. Study Group 17, pp. 1-49 (Dec. 2006).

English translation of the Written Opinion of the International Searching Authority for International application No. PCT/CN2006/002703, mailed Feb. 1, 2007, 4 pgs.

European Patent Office Communication pursuant to Article 94(3) EPC for application No. 06804927.9, dated Dec. 30, 2009, 3 pgs.

Second Office Action issued by the State Intellectual Property Office of the PRC for application No. 200510100415.7, dated Jul. 25, 2008, 6 pgs., partial English translation attached.

International Telecommunication Union; ITU-T x.1125; Telecommunication Standardization Sector of the ITU; Series X: Data Networks, Open System Communications and Security; Telecommunication Security; Correlative Reacting System in the Mobile Data Communication, Jan. 2008, 61 pgs.

* cited by examiner

METHOD FOR IMPLEMENTING SECURITY UPDATE OF MOBILE STATION AND A CORRELATIVE REACTING SYSTEM

FIELD OF THE INVENTION

The present invention relates to security techniques for mobile networks, and particularly to a method for implementing security update of mobile station and a correlative reacting system.

BACKGROUND OF THE INVENTION

A Correlative Reacting System (CRS) is a system against security threat from insecure terminals in a mobile network by controlling the access of the insecure terminals, such as the mobile stations which are not compliant with the specified security policy (e.g., which have a potential security problem or have been infected by virus) in mobile networks. A CRS controls the access of a mobile station to the network and limits the access of the mobile station to application services by means of the security cooperation of the mobile station and the network side, thereby improving the immunity of the network from virus, worms, and network attacks, etc.

Figure 1:
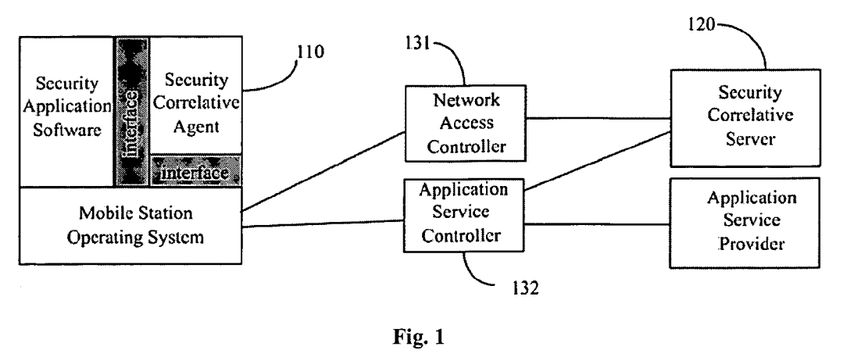
FIG. 1 is a schematic diagram of the structure of a correlative reacting system in the prior art.

FIG. 1 illustrates the structure of a correlative reacting system which includes a Security Correlative Agent (SCA) 110 at a mobile station (MS) side, a Security Correlative Server (SCS) 120, and a Network Access Controller (NAC) 131 and an Application Service Controller (ASC) 132 which are connected to the mobile station and the SCS 120. In implementation, the NAC 131 and the ASC 132 may be two separate entities, or may be two separate function units in one entity. One SCS 120 may be connected to a plurality of NACs 131 and/or ASCs 132, and one NAC 131 and/or ASC 132 may control the application services and/or the access to network of a plurality of mobile stations.

The SCA 110 collects the Security Correlative Information (SCI) of the mobile station and reports the collected security correlative information to the SCS 120.

The SCS 120 is a control and analysis/processing unit of the CRS, which is adapted to receive, analyze, and store the reported security correlative information, perform a correlation analysis on the information, and send a CRS control command to the NAC 131, the ASC 132 or the SCA 110. By means of association operation with the NAC 131, the SCS 120 limits the access of a user to the network, so as to prevent the network resources from being occupied unreasonably by insecure terminals and prevent the spreading of vicious virus in the network. By means of the association operation with the ASC 132, the SCS 120 limits or forbids a user to use a particular application service, so as to protect the mobile network from the security risks resulted from an insecure service.

In the implementation of a correlative reacting system and method, it is necessary for a mobile station to have the corresponding components, and thus the corresponding mechanism for the installation of the components of the mobile station is necessary. In general, due to the complexity of the installation and configuration process, the intervention of the user should be as less as possible in order to ensure the efficiency and accuracy of the installation. In addition, it is necessary to perform a real time update on the mobile station when the status of the mobile station changes, especially when a hidden danger is present at the terminal side, so as to reduce the duration of an insecurity state of the mobile station as much as possible, thus avoiding any affect on the normal utilization of the user, and any adverse affect on the security performance of the network. Moreover, in the prior art, there is a lack of a solution for collecting, arranging, reporting, analyzing the security correlative information of a mobile station and for controlling and updating the access policy of the mobile station according to the security correlative information.

SUMMARY OF THE INVENTION

The embodiments of the present invention provides a method for implementing security update of mobile station and a correlative reacting system, which provides the automatic security update of the mobile station according to the information of the mobile station and may reduce the probability of error and improve the security performance of the system.

According to an aspect of the present invention, there is provided a method for implementing security update of mobile station which includes:

performing an information interaction with the mobile station by an entity in a correlative reacting system;

delivering, by a network side of the correlative reacting system, security update control information to the mobile station when it is determined according to the information interaction that a security update is necessary;

implementing an automatic security update of the mobile station according to the security update control information.

According to another aspect of the present invention, there is provided a correlative reacting system, performing an information interaction with a mobile station, and including a security correlative server at a network side, a network access controller and an application service controller connected with the security correlative server, wherein when determining according to the information interaction that a security update is necessary, the security correlative server or the network access controller delivers security update control information to the mobile station and assists the mobile station to implement an automatic security update according to the security update control information.

According to yet another aspect of the present invention, there is provided a correlative reacting system including a network side and a mobile station, wherein the network side is adapted to perform an information interaction with the mobile station, and deliver security update control information to the mobile station on determination a security update is necessary according to the information interaction.

In the present invention, the correlative reacting system performs an information interaction with the terminal side, and controls the automatic security update of the mobile station according to the result of the information interaction, so as to make an automatic processsing upon the variation in the state of the mobile station, thus improving the security of the mobile station and reducing the threat of insecure terminals to the network. In addition, the security update is automatic without the participation of the user, so that the burden of the user in security processing may be lowered, the service communication quality may be improved, and the communication burden of the operator may be reduced.

In an embodiment of the present invention, the NAC may automatically probes whether a mobile station needs to install an SCA, and triggers the mobile station to download and install the SCA when the mobile station needs to install the SCA. As a result, the user does not need to download and install an SCA manually, which brings convenience to the user.

In an embodiment of the present invention, the SCS may automatically probes whether a mobile station needs to install an SCA, and triggers the mobile station to download and install the SCA when the mobile station needs to install the SCA. As a result, the user does not need to download and install an SCA manually, which brings convenience to the user.

In an embodiment of the present invention, the SCA may automatically collects, arranges and reports the SCI of a mobile station; and the SCS updates the access control and service control of the mobile station according to the SCI reported by the SCA, so as to effectively respond the security condition of the mobile station by means of the interaction of the mobile station and network side, to adapt to the variation in the state of the mobile station, and to ensure the security performance of the network.

In addition, the security correlative agent at the terminal side may automatically provide a user with a security condition prompt, may generate a mobile station security condition report according to the collected security information from the terminal side and the evaluation result of the security level of the mobile station by the SCS, for the user to query; and may assist the mobile station to fix the insecurity factor under the control of the SCS, so as to improve the security performance of the network.

DETAILED DESCRIPTION OF THE PREFERRED EMBODIMENTS

Figure 2:
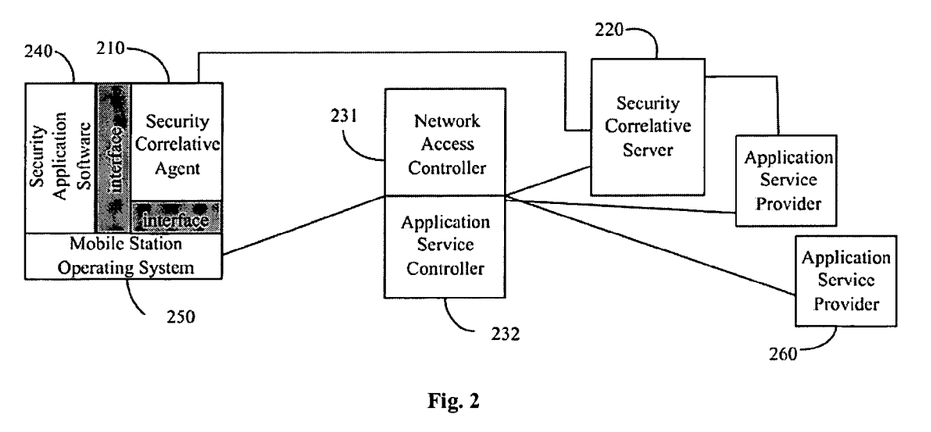
FIG. 2 is a block diagram showing a correlative reacting system according to an embodiment of the present invention.

In the embodiments of the present invention, the automatic security update at the terminal side can be implemented based on the correlative reacting system shown in FIG. 2.

In FIG. 2, the correlative reacting system includes a Security Correlative Agent (SCA) 210 at a mobile station (MS) side, a Security Correlative Server (SCS) 220 at network side, and a Network Access Controller (NAC) 231 and an Application Service Controller (ASC) 232 which are connected to the mobile station and the SCS 220. In implementation, the NAC 231 and the ASC 232 may be two separate entities, or may be two separate function units in one entity. One SCS 220 may be connected to a plurality of NACs 231 and/or ASCs 232, and one NAC 231 and/or ASC 232 may control the application services and/or the access to network of a plurality of mobile stations.

The SCA 210 collects the Security Correlative Information (SCI) of the mobile station including security configuration information and security condition information, such as the condition of virus infection, system security configuration information, application security configuration information, and version condition of the loophole library and the virus library. The SCA 210 processes and organizes the collected security correlative information preliminarily, and reports the resulting information to the SCS 220.

In addition, the SCA 210 receives the security update command and instruction from the SCS 220, on one hand, to report the abstract of security information of the mobile station to the user, and on the other hand, to provide necessary information and cooperation for the external components of the mobile station, so as to recover the insecure mobile station.

The SCS 220 communicates with the SCA 210 via an air interface, is a control and analysis/processing unit of the CRS, and is adapted to receive, analyze, and store the security correlative information reported by the SCA 210, and to perform a correlation analysis on the information. The SCS 220 controls the network access capability of the insecure mobile station according to the security policies set at the network side, and cooperates with other network equipments to assist the mobile station with security update. In particular, the SCS 220 may send a CRS control command to the NAC 231, the ASC 232 or the SCA 210. By means of the association operation with the NAC 231, the SCS 220 limits the access of a user to the network, so as to prevent the network resources from being occupied unreasonably by insecure terminals and prevent the spreading of vicious virus in the network. By means of the association operation with the ASC 232, the SCS 220 limits or forbids a user to use a particular application service, so as to protect the mobile network from the security risks resulted from an insecure service. By sending the CRS command to the SCA 210, the SCS 220 assists the terminal side to implement the automatic security update service.

An SCS database (SDB) (not shown in the drawings) is provided in the SCS 220, for storing the security association operation information and selective service description of the users and the like which are the static user information necessary for providing security association operation by the CRS, and the dynamic information of user security status and service condition and the like.

The NAC 231 carries out the network access control policy of the security policies, performs a traffic control-based network access control including the limitation, blocking, redirection of traffic and the like, on the mobile station. The ASC 232 carries out the service access control policy of the security policies, performs an application layer-based service access control on the mobile station. The SCA at the terminal side may cooperate with the mobile station to ensure that the terminal user cannot initiate a forbidden service, so as to save the network resources.

The CRS communicates with the external components via CRS service interfaces including the external interface of SCA at the terminal side and the external interface of SCS at the network side. That is, the SCA 210 and the SCS 220 may not only communicate inside the CRS, but also receive the security information from the external components via a variety of CRS service interfaces. By means of the CRS association operation, the SCA 210 and the SCS 220 may implement the CRS functionalities including network access control and service access control of the mobile station in accordance with the security policies of the network.

Wherein, the SCA 210 carries out a bidirectional information delivery with the Security Application Software (SAS) 240 and the Mobile Station Operation System (MSOS) 250 via the external interface at the terminal side. For example, the SCA 210 may collect the Security Correlative Information (SCI) of the mobile station via the interface.

The SCS 220 is connected to the Security Application Software Server (SAS-S) and the Mobile Station Operating System Update Server (MSOS-US) via the external interface of SCS at the network side.

In addition, the SCS 220 also connects and communicates with an Application Service Provider (ASP) 260 in the external network. The ASP 260 includes the MSOS-US and the SAS-S as well as other service resources.

At the terminal side, the automatic security update service provided to the user by the CRS mainly includes a terminal security condition report and a terminal security environment enhancement and the like.

The terminal security condition report is produced automatically by the SCA according to the security correlative information collected from the terminal side and an evaluation result of terminal's security degree sent back from the SCS, for the active query from the user.

The terminal security environment enhancement is a process for controlling the mobile station to implement an automatic security update when the CRS discovers an insecure factor in the mobile station. The implementation of the terminal security environment enhancement needs not only the participation of both the SCA and the SCS, but also the association operation of the CRS and the correlative systems at both the terminal and network sides. With the terminal security environment enhancement, the insecurity threats suffered by the mobile station may be reduced, the mobile network may be protected from the insecurity threats resulted from an insecure terminal by protecting the mobile station and limiting the access of the mobile station to the network, so as to protect the mobile station from being used as a gangway for implementing other attacks by a virus, to ensure the network to provide a service of reliable quality for the user, and to stop the unexpected cost resulted from a virus or a misoperation in favor of the customers.

The mobile station security condition report and the mobile station security environment enhancement from the SCA are generally initiated when the CRS discovers an insecurity factor present in the mobile station, which particularly include:

(1) Automatic Discovery, Installation and Upgrade of the SCA of the Mobile Station After a user has registered into a network for the first time, if the SCA of the mobile station has been started, the SCA initiates an initialization process, and carries out its registration to the SCS. If the SCA at the terminal side has not been started or is not installed, while the mobile station supports the CRS function, the network side notifies the SCS. The SCS provides the address information for downloading the SCA software or issues a SCA enabling instruction, thus the SCA may be installed and started automatically. The operator's network side may be required to provide downlink channel for bearing the installation of the SCA, and to provide prompts for the installation or starting in an appropriate manner.

On discovering that it is necessary to update the version of SCA, the SCS notifies the SCA of the download resource address and the emergency for updating, so that the automatic update may be carried out. In other words, the network side may control a mobile station to carry out an automatic security update on discovering that a potential security problem is present in the mobile station, so as to fix the potential security problem. Most of the CRS procedures are carried out automatically when the CRS system provides the automatic security update function, and generally do not require the participation and confirmation of the terminal user, so as to ensure the mobile station to perform the security update automatically.

(2) The Automatic Recovery of Insecure Mobile Station

The SCA collects the security environment information of the mobile station actively or passively via a CRS service interface, and reports the information to the SCS at the network side. The SCS checks and determines whether there is an insecurity factor unmatched with the security policy according to the overall security policy, the security service level information of the user, and other security information and other customized service information of the user stored in the SDB. If there is an insecurity factor in the mobile station, for example, if the virus library needs to be upgraded, or the version of the virus software needs to be updated, and the like, the SCA will be notified. In addition, if necessary, for example, if the update process has to be initiated by a software server of the anti-virus software provider, the SCS will automatically notify the server of the anti-virus software provider or the terminal system developer of the correlative information or instructions, control the MSOS/SAS-A of the terminal to interact with the remote security application server and the operating system server for further automatic security update and recovery.

After evaluating the insecurity factor of the mobile station, the SCS, if necessary, will operate associatively with the NAC and the ASC according to the security policy, to perform the network access control and the service control on the mobile station.

Furthermore, when the CRS does not know the security condition of the mobile station or the security event occurred in the mobile station, such as that the mobile station may be or has been infected by a virus, the CRS performs a security processing on the data traffic of the mobile station, so that the network security may be achieved by a security technical means without any affect on the user, for example, by filtering out the insecure content in a data packet of the user by the network's anti-virus gateway before forwarding the data packet.

For user service restriction or unavailability information resulted from the above procedure, the CRS will notify the user, and provide a further guidance service when necessary. If the user queries actively, the CRS also has to provide the results of correlative security services and the correlative security information. The user may ignore or forbid all the mobile station security condition report information provided thereto, so as not to be interfered.

In the case of limited network resources, the automatic update of the mobile station may be affected. The SCA or the SCS may accomplish the automatic security upgrade in a stepwise manner according to the security service level subscribed by the user, so as to ensure the automatic update of the mobile station with a higher security service level to be accomplished preferentially.

It is to be noted that, by setting the security policy, an obligatory security update of the mobile station, such as the upgrade of the virus killer software or the installation of a patch for vulnerability, may be carried out at the network side within a preset period, regardless of the occupy of network resources.

It is also to be noted that a service provided by the CRS at the terminal side is valid only when the SCA is enabled.

In case of the failure of the security update caused by the terminal side, the SCA will save the condition information automatically, start an abnormity timer, and retrigger the security update via the timer. In case of the failure of the security update caused by network resource or other network problem, the SCS will evaluate the security condition of the mobile station, and then adjust and automatically implement the security policy, so as to avoid a severer security risk. The abnormity processing will be logged, and will be checked and processed by an administrator through a CRS management interface.

(3) The Function that the Administrator at the Network Side Forbids to Use the CRS This function is provided by the CRS system. At the network side, the administrator may set that a certain mobile station is not restricted by the CRS. However, this function is not recommended.

According to the embodiments of the present invention, there may be many ways for implementing the automatic security update, all of which are based on the principle of software/hardware automatic update of the mobile station or the network with the least participation of the user in the maintenance of network security.

An implementation according to the embodiment of the present invention is the automatic downloading and installation of SCA. The NAC automatically probes whether the mobile station has an SCA installed; if not, the NAC assists the mobile station in downloading and installation, and provides necessary initialization configuration information for the SCA in the mobile station. In this case, the mobile station has passed the user verification of the wireless network, and has connected to the data network, and a secure information transmission channel has been present between the NAC and the SCS.

Figure 3:
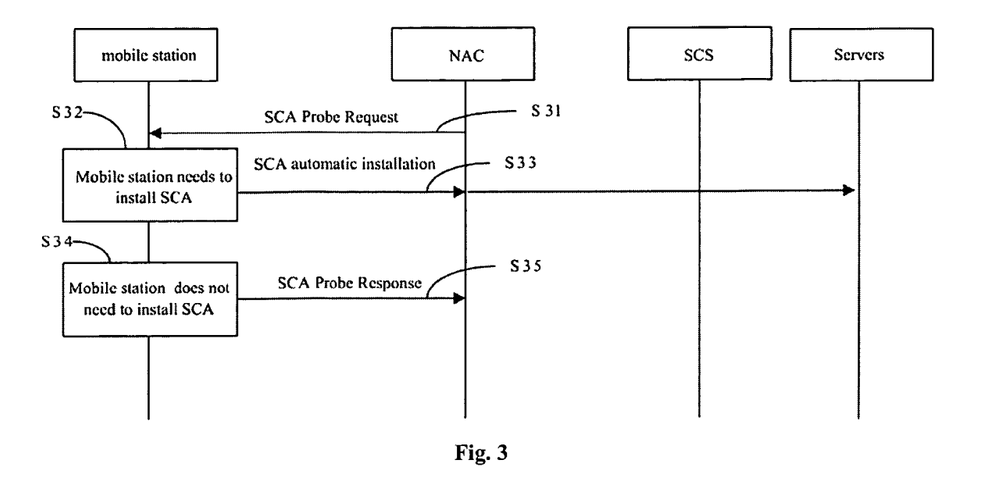
FIG. 3 is a flow chart illustrating the process of a NAC probing whether it is necessary to install an SCA in a mobile station performed in the method according to an embodiment of the present invention.

Refer to FIG. 3, the procedure that a NAC probes whether it is necessary to install an SCA in a mobile station according to an embodiment of the present invention is as follows:

Step S31, the NAC sends an SCA probe request to the mobile station.

The SCA probe request contains the initialization configuration information required by the SCA, such as the domain name, the access point name, the IP address, the service port of the SCS and the like. The particular content of the SCA probe request is configured by the SCS, and is encrypted and transmitted via the secure channel between the SCS and the NAC, and is delivered in advance to the NAC as the control information.

The sending policy of the SCA probe request, such as the sending interval, the sending times, the time setting of the timeout timer in case of no feedback for the SCA probe request, etc., may also be delivered by the SCS in advance to the NAC. The sending policy may be updated by the NAC initiatively (periodically or as required), or by the SCS actively, or by the negotiation between the NAC and the SCS.

The destination address of the SCA probe request may be the unicast address of the mobile station or a particular multicast address (an SCA group). When it is necessary for the NAC to send a same SCA probe request to a plurality of mobile stations, the multicast manner may be utilized so as to reduce the load of the NAC and the bandwidth consumption of the network, for example, when a plurality of mobile stations simultaneously start connections to a data network through the NAC for accessing the data network. In a multicast SCA probe request, which SCAs need to respond may be set, for example, all the SCAs need to respond, or an SCA that has never sent a response after connecting to the data network needs to respond, or the like. When only a few mobile stations simultaneously start the connections to the data network, or when some mobile stations should be treated differently, the NAC may utilize the unicast manner to send the SCA probe request.

Step S32, if the mobile station has no SCA installed, or if the SCA cannot operate normally due to the damage of the software, the mobile station will not be able to respond the SCA probe request sent from the NAC. At this time, it is necessary to install the SCA in the mobile station.

In particular, a timeout timer may be set at the NAC side; if the NAC does not receive any response sent back from the mobile station within a preset time of the timeout timer, the NAC determines that it is necessary to install the SCA in the mobile station.

In another embodiment of the present invention, a threshold for sending the SCA probe request is set at the NAC side. If the NAC does not receive any response sent back from the mobile station within a preset time of the timeout timer, the NAC sends the SCA probe request to the mobile station repeatedly. If the NAC does not receive any response sent back from the mobile station within the preset time of the timeout timer, and the number of the sent SCA probe requests is greater than the threshold for sending the SCA probe request, the NAC determines that it is necessary to install the SCA in the mobile station.

Step S33, if the NAC determines that it is necessary to install the SCA in the mobile station, it triggered the mobile station to start the process of downloading and installing the SCA.

Step S34, if the mobile station has installed the SCA and the SCA is able to operate normally, the SCA extracts and saves the initialization configuration information contained in the SCA probe request sent by the NAC, such as the domain name, the access point name, the IP address, and the service port of the SCS, etc.

Step S35, the SCA sends an SCA probe response to the NAC.

The SCA probe response contains the information for notifying that it is unnecessary to install the SCA. It may also contains the information including the SCA's ID, the SCA's IP address and the like. The particular content of the SCA probe response may be specified by the NAC in the SCA probe request, or may be determined by the SCA according to the default security policy.

As described in step S33, when the NAC detects that it is necessary to install the SCA in the mobile station, it triggers the mobile station to start the SCA automatic installation process. It is to be noted that whether it is necessary to install the SCA in the mobile station is probed and determined by the NAC. However, the mobile station carrying out the SCA automatic installation is triggered when the mobile station sends a data service request to a certain ASP.

Figure 4:
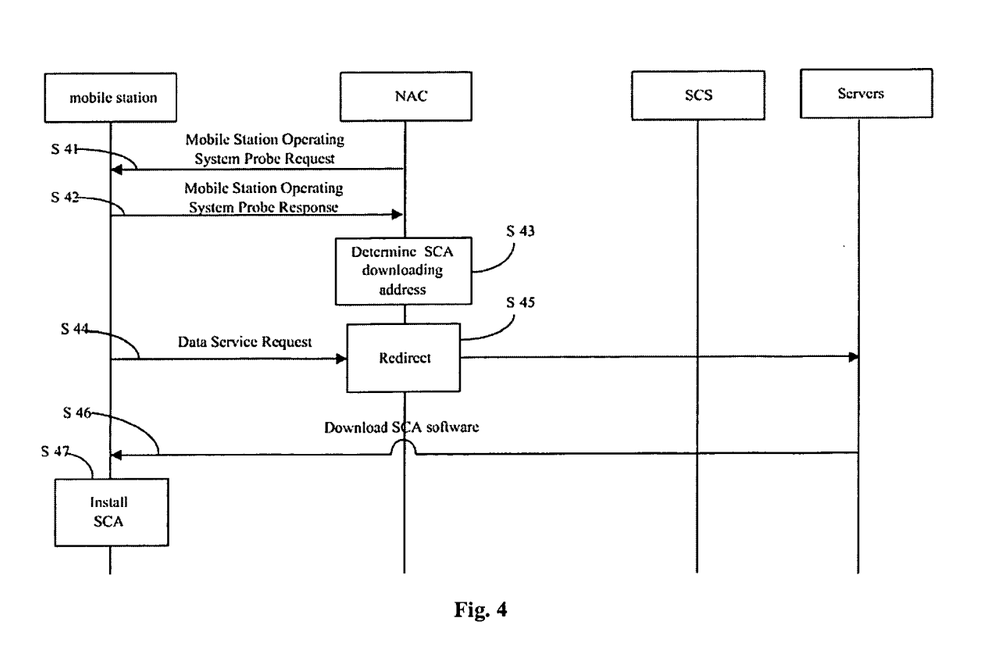
FIG. 4 is a flow chart illustrating the process of installing an SCA in a mobile station performed in the method according to an embodiment of the present invention.

Refer to FIG. 4, the procedure for installing an SCA in a mobile station according to an embodiment of the present invention is as follows:

Step S41, upon determining that it is necessary to install an SCA in a mobile station, the NAC sends a Mobile Station Operating System (MSOS) probe request to the mobile station, to probe the type of the mobile station operating system/platform.

In general, the information, including the shared resources, the type of the mobile station operating system/platform and the like, may be obtained from the information fed back by requesting the particular information at a particular port of the mobile station. The NAC may send the MSOS probe request to one or more mobile stations via multiple ports simultaneously, and listens to the corresponding port(s) for the corresponding information.

Step S42, the mobile station returns to the NAC an MSOS probe response containing the information including the type of the MSOS and the like.

Step S43, the NAC determines the address for downloading the SCA to be installed in the mobile station according to the information including the type of the MSOS and the like.

Step S44, the NAC receives a data service request sent by the mobile station to an ASP. The data service request needs to be forwarded by the NAC.

Step S45, the NAC redirects the data service request sent from the mobile station to the address for downloading the SCA.

Step S46, the mobile station logins to the correlative server according to the address for downloading the SCA, and downloads the SCA corresponding to its operating system.

Step S47, the mobile station installs the SCA.

In an embodiment of the present invention, in the above described procedure, when the SCA is a terminal software developed with across-platform techniques, for example, if it is developed with the Java language, it is unnecessary for the NAC to send the MSOS probe request to the mobile station to obtain the information about the type of the MSOS. That is, steps S41, S42, and S43 may be omitted.

In the above described procedure, the mobile station may request a service from the ASP before the downloading of the SCA is finished; at this time, the data service request is forwarded by the NAC. The NAC can not obtain the security correlative information of the mobile station reported by the SCA since the installation of SCA has not been finished yet, so that it is difficult to determine the security condition of the mobile station. Thus, the data service requests sent by the mobile station may bring a security threat to the network. In view of this, the NAC carries out the corresponding security processing on the data service requests sent by the mobile station, for example, dropping all the requests, forwarding some of the requests optionally or redirecting the requests to a dedicated security device, such as an anti-virus gateway. The specific processing may be configured by the NAC, or may be configured by the SCS and delivered to the NAC to be carried out, or may be negotiated and confirmed by the NAC and the SCS, and so on.

In another embodiment of the present invention, the NAC may not probe the type of the MSOS. When the mobile station initiates a data service request to an ASP, the NAC redirects the data service request to the address for downloading the SCA; the user of the mobile station may install the SCA suitable for the type of the MSOS manually; or the installation and downloading server of the SCA may determine the type of the mobile station operating system/platform according to the connection information of the mobile station, so as to decide which SCA software is suitable to be downloaded by the mobile station.

Figure 5:
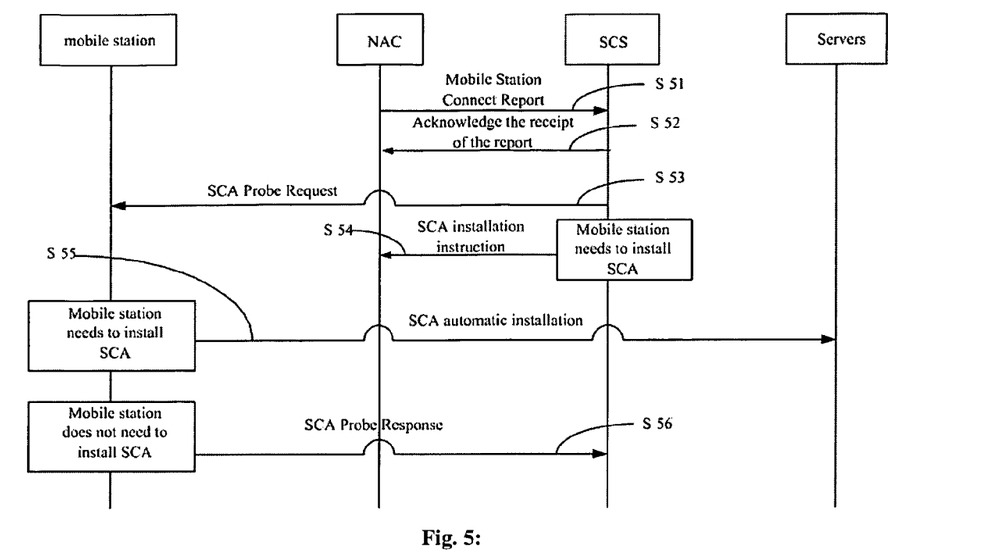
FIG. 5 is a flow chart illustrating the process of an SCS probing whether it is necessary to install an SCA in a mobile station performed in the method according to an embodiment of the present invention.

In the above described embodiments, whether it is necessary to install an SCA in a mobile station is probed by the NAC. Of course, this probing can also be implemented by other equipments at the network side, such as the SCS. Refer to FIG. 5, the procedure that an SCS probes whether it is necessary to install an SCA in a mobile station according to an embodiment of the present invention is as follows:

Step S51, when the mobile station connects to the data network, the NAC sends a Mobile Station (MS) Connect Report to the SCS.

The MS Connect Report contains the information including the IP address and the User ID of the mobile station and the like.

In addition, the NAC opens the limitation of the mobile station's access to the SCS.

Step S52, the SCS sends an acknowledgement to the NAC that a valid MS Connect Report is received.

Step S53, the SCS sends an SCA probe request to the mobile station, to request the SCA in the mobile station to report the security condition of the mobile station to the SCS.

The SCA probe request may contain the IP address and the service port of the SCS, as the initialization information for communication between the SCA and the SCS.

If the SCA is not installed in the mobile station, or if the SCA can not operate normally due to the damage of the software and the like, the mobile station will not be able to respond the SCA probe request sent from the SCS. At this time, the SCS determines that it is necessary to install the SCA in the mobile station, and then the procedure proceeds to Step S54.

In particular, a timeout timer may be set at the SCS side. If the SCS does not receive any response sent back from the mobile station within a preset time of the timeout timer, the SCS determines that it is necessary to install the SCA in the mobile station.

In another embodiment of the present invention, a threshold for sending the SCA probe request is set by the SCS. If the SCS does not receive any response sent back from the mobile station within a preset time of the timeout timer, the SCS sends the SCA probe request to the mobile station repeatedly. If the SCS does not receive any response sent back from the mobile station within the preset time of the timeout timer, and the number of the sent SCA probe requests is greater than the threshold for sending the SCA probe request, the SCS determines that it is necessary to install the SCA in the mobile station.

Step S54, the SCS notifies the NAC that it is necessary to install the SCA in the mobile station. In particular, the SCS may send an MS Connect Response A to the NAC.

The MS Connect Response A may contain the information including the IP address and the User ID of the mobile station and the like.

Step S55, the SCA starts the SCA automatic installation process, so as to accomplish the automatic installation of the SCA.

If the SCA has been installed in the mobile station and can operate normally, the procedure proceeds to Step S56, in which the SCA feeds back an SCA probe response to the SCS.

The SCA probe response may contain the information including the IP address of the mobile station, the SCA ID, the User ID, and the like, so as to give a prove to the SCS that the SCA has been installed in the mobile station and can operate normally.

As shown in step S55, upon determination that it is necessary to install the SCA in the mobile station, the SCS notifies the NAC, and the automatic installation of SCA will be started. Whether it is necessary to install the SCA in the mobile station is probed and determined by the SCS. However, the automatic installation of SCA is triggered by the mobile station sending a data service request to a certain ASP.

Figure 6:
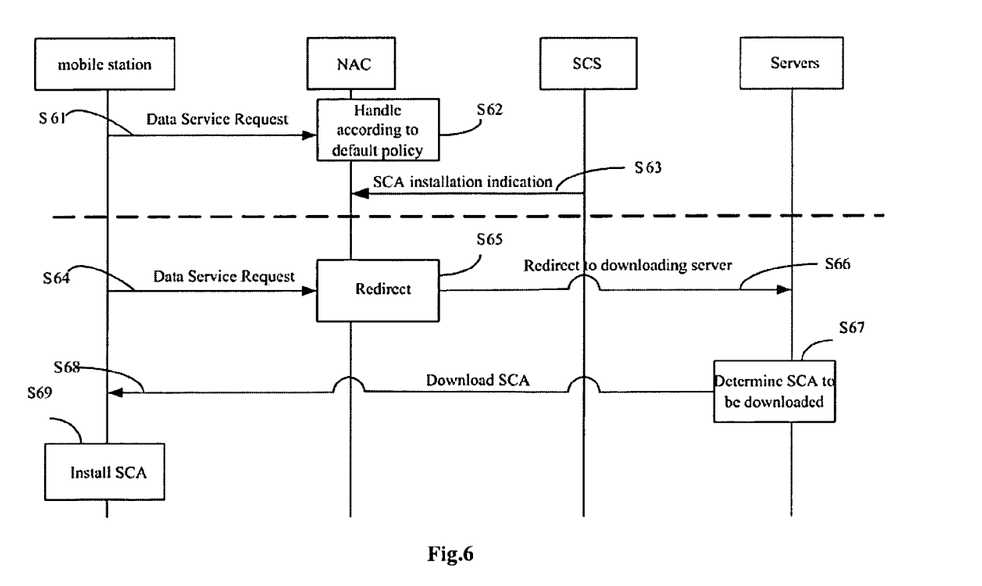
FIG. 6 is a flow chart illustrating the process of installing an SCA in a mobile station performed in the method according to another embodiment of the present invention.

Refer to FIG. 6, the automatic procedure for installing an SCA in a mobile station according to an embodiment of the present invention is as follows:

Step S61, the NAC receives a data service request initiated by the mobile station to an ASP.

Step S62, if the NAC has not received a notification from the SCS that it is necessary to install an SCA in the mobile station yet, the NAC will process the data service request as received in Step S61 according to a default policy.

In this case, the network side does not know the security condition of the mobile station, and the data messages sent by the mobile station may bring a security threat to the network. Thus, the policy of the NAC for processing these data messages may be forwarding all the messages, dropping all the messages, forwarding some of the messages optionally or redirecting the messages to a dedicated security device, such as an anti-virus gateway, and so on. The particular policy may be configured by the SCS and delivered to the NAC, and may be correlative with the user. The particular policy for each user may be different.

Step S63, the NAC receives a notification from the SCS that it is necessary to install an SCA in the mobile station, and starts to perform the redirection for the mobile station.

Step S64, the mobile station continues to initiate a data service request to the ASP.

Step S65, the NAC redirects the data service request sent from the mobile station to the server for downloading the SCA.

Step S66, the mobile station connects to the server for downloading the SCA. This connection may be of, but is not limited to, an HTTP type.

Step S67, the server for downloading the SCA determines the SCA to be downloaded according to the parameters transferred from the mobile station when the mobile station establishes the connection with the server. The parameters may be the information, such as the type of operating system and the like.

Step S68, the mobile station downloads the SCA.

Step S69, the mobile station installs the SCA.

It is to be noted that the Step S62 is implemented only when the NAC does not receive the notification from the SCS that it is necessary to install an SCA in the mobile station and when the security condition of the mobile station is unable to be evaluated.

Another exemplary application of the embodiment of the present invention is to implement the update of the security correlative information (SCI) and the automatic security update of the security policy. In an embodiment of the present invention, the SCA collects and arranges the SCI of the mobile station according to an built-in policy or a policy delivered by the SCS, and generates and sends a security correlative information report to the SCS. Upon receiving the SCI of the mobile station, the SCS carries out a correlation analysis on the SCI together with the information including the service control policy and the access control policy of the mobile station user, and so on, evaluates the security condition of the mobile station, and updates the service control policy and the access control policy of the mobile station. In addition, the SCA may generate a terminal security condition report for the user according to the SCI of the mobile station and the result of the correlation analysis performed by the SCS on the SCI.

The SCI of the mobile station may be used by the SCS to determine the security condition of the mobile station. The SCS stores the SCI of the mobile station in the SDB. The SCI of the mobile station includes the following information:

1. Report Serial Number

The report serial number is a incremental positive integer, used for identifying the order of the SCI reports during one data network connection session. The SCS may identify whether there is a retransmission, loss or mis-order of an SCI report by use of the report serial number. The report serial number is optional in an SCI report.

2. SCA ID

An SCA ID is utilized to uniquely identify an installed SCA in a mobile station. The SCA ID is utilized to identify to which SCA an SCI response from an SCS server should be sent. When an SCA receives a message from an SCS server, while the SCA ID in the message is not consistent with that of the SCA, the SCA recognizes that an error occurs, and then drops the message and sends an error notification to the SCS server.

3. Mobile Station ID

The mobile station ID is utilized to uniquely identify the hardware equipment of a mobile station.

4. SCS ID

The SCS ID is utilized to uniquely identify an SCS server. When an SCS server receives an SCI report, while the SCS ID in the report is not consistent with that of the SCS, the SCS drops the report.

5. User Identity Information of Mobile Station

The user identity information of a mobile station is utilized by the SCS to distinguish the mobile users.

6. The Report Body, which Contains the Following Content:

(1) the type information of the mobile station operating system/platform, the information of the vulnerabilities and the patches for the mobile station operating system;

(2) the security log, the alarm information of the mobile station operating system;

(3) the installation information of the security software of the mobile station, such as whether an anti-virus software or a firewall software has been installed;

(4) the information such as the version of the security software of the mobile station, the date of the database, the virus scanning policy, whether a full scanning has been performed after the virus library is updated, the condition about the discovery of viruses, and the like;

(5) the policy with which the SCA reports an SCI report to the SCS, for example, the SCA sending the SCI report periodically to the SCS, the SCS actively querying the SCI report, or an event of the mobile station, such as the event that a terminal anti-virus software discovers a virus and the event that a terminal firewall detects a network attack to the terminal, triggering the reporting of the SCI report.

In the embodiment of the present invention, the SCI update process follows the establishment of the secure information transmission channel. The SCI report and its response information, the security control policy update request and its response information are encrypted and transmitted in the secure information transmission channel, so as to ensure the consistency, integrity and undeniability of the information.

Figure 7:
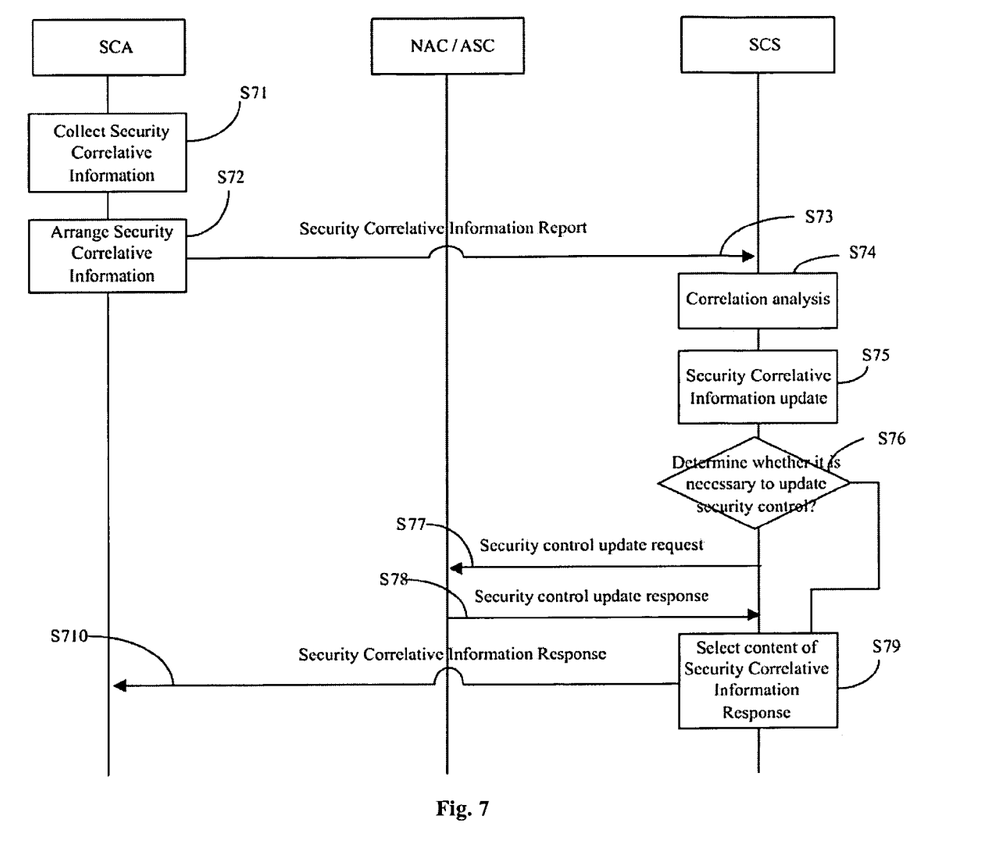
FIG. 7 is a flow chart illustrating the process for updating the security correlative information performed in the method according to an embodiment of the present invention.

FIG. 7 illustrates the procedure for automatic update according to an embodiment of the present invention.

Step S71, the SCA collects the security correlative information of a mobile station in real time via the interfaces with the software including the MSOS and the SAS of the mobile station, for example, the information such as the vulnerability/patch information of the mobile station operating system, security log and alarm information of mobile station operating system, the security software version of the mobile station and the date of the database, the user identity of the mobile station or the policy with which the SCA sends the SCI report to the SCS, and the like.

Step S72, the SCA arranges and filters the collected security correlative information of the mobile station, and selects the corresponding content and an appropriate opportunity to report the information to the SCS. The SCA saves the information including the latest SCI of the mobile station, the information content in the recent SCI reports, the security report policy or the SCI response received from the SCS, etc.

In an embodiment of the present invention, the SCA may report the entire SCI of the mobile station to the SCS every time.

In another embodiment of the present invention, the SCA sends the SCI of the mobile station to the SCS according to the security report policy set up by the SCS, instead of reporting the entire SCI of the mobile station to the SCS every time. The security report policy is set up and delivered by the SCS to the SCA. For example, the SCA sends only the information of the variation between two SCI reports. In an embodiment, after the user passes the authentication and connects to the data network, the SCI report sent by the SCA for the first time needs to contain the entire SCI information, the following SCI reports send only the SCI update information or only the feedback information of the execution result of the last SCI response returned by the SCS.

Step S73, when it is the sending opportunity specified by the security report policy, the SCA selects the corresponding content and sends an SCI report to the SCS via a secure information transmission channel. In addition to the relevant SCI of the mobile station, the SCI report may contain the information including the message serial number, the SCA ID and the SCS ID, etc. The SCA ID, the message serial number and the SCS ID are used to uniquely identify an SCI report message. By using the information, the SCS may identify whether the report is repeated, whether there is a loss between the two received SCI reports, whether the SCS is a valid receiving end, and so on.

Step S74, upon receiving the SCI report, the SCS performs validity verification on the SCI so as to determine whether the SCI is correct and valid, and carries out a correlation analysis according the security policy. For example, the SCS may compare the correlative information in the SCI report with the information stored in the local SDB, to determine, for instance, whether the SCA ID, the message serial number, and the SCS ID are correct and valid, whether the SCS ID is accurate, and so on.

The correlation analysis includes the correlation analysis of the various information of a single user and the correlation analysis of similar information of multiple users. The security condition of one mobile station and the security condition of multiple mobile stations within one network are analyzed respectively, so as to analyze the overall security state of the network. The security policy is predefined by the system and stored in the SDB of the SCS.

Step S75, the SCS compares the SCI stored in the SDB of the SCS with the SCI of the mobile station as well as the correlation analysis result, updates the SDB to keep the latest SCI being stored in the SDB.

Step S76, the SCS determines whether it is necessary to update the network access control policy or the application service control policy of the mobile station according to the correlation analysis result. If the update is unnecessary, the procedure proceeds to Step S79; otherwise, the procedure proceeds to Step S77.

Step S77, the network access control policy or the application service control policy of the mobile station needs to be updated. The SCS sends a security control policy update request to the NAC or the ASC via the secure information transmission channel. The security control policy update request contains the information including the SCA ID, the user ID, the updated security control policy of the controlled mobile station, and the like. The security control policy update request is encrypted and transmitted via the secure information transmission channel between the SCS and the NAC/ASC. This secure information transmission channel may adopt an existing security mechanism, such as the Transport Layer Security (TLS), the Common Open Policy Service Protocol (COPS), etc., or may adopt the security mechanism established by the CRS itself.

Step S78, the NAC or the ASC returns a security control policy update response to the SCS via the secure information transmission channel to feed back the update result of the security control policy of the mobile station.

Step S79, the SCS selects the content of the SCI response to be fed back to the SCA according to the correlation analysis result and the update condition of the security control policy.

In an embodiment of the present invention, it may be unnecessary for the SCS to send an SCI response to the SCA each time of receiving an SCI report sent by the SCA. For example, when the SCA sends an SCI report to the SCS periodically and the SCS determines that it is unnecessary to update the security control policy and the software after the correlation analysis, the SCS may select to send one SCI response to respond several SCI reports sent by the SCA.

Step S710, the SCS sends an SCI response to the SCA via the secure information transmission channel. The SCI response contains the security control information fed back by the SCS to the SCA, such as the patch to be installed in the mobile station operating system and its downloading address, the address for upgrading the security software of the mobile station, the requirement of the SCS on the security policy of the SCA (including the security report policy for sending the SCI report by the SCA to the SCS) and the security control policy update information of the mobile station, etc.

For the upgrade and update of the mobile station operating system, the SCA and the security application software, etc., the SCS may define various policies according to the different security levels of the upgrade and update. For example, the update may be installed immediately, the network access or the service access may be limited or cancelled before the update is installed; or the updated may be installed before a certain time point or a certain time period, and if the time limit is exceeded, the network access or the service access may be limited or cancelled. In the above described two cases, the access of the mobile station to the update-correlative upgrade server is always present.

In an embodiment of the present invention, the SCA may generate a mobile station security condition report according to the collected SCI of the mobile station and the content of the SCI response returned by the SCS to the SCA, in order to be queried by the mobile user, and may provide corresponding security prompt information to the user during the update of the SCI. For example, the admission protocol information may be prompted to the user during the installation of the SCA; when the network access or service access of the user is limited, cancelled or reopened, the correlative information may be prompted to the user.

In an embodiment of the present invention, when the above described procedure is terminated, the mobile station may initiate the update of the SCA software, of other security application software, or of the mobile station operating system, according to the content or instruction in the SCI response. For example, the SCA obtains the software content to be updated, and the address thereof from the SCI response of the SCS, so as to update the corresponding software. When the software is updated, it may be necessary to repeat the above described SCI update process once or several times, so that the SCA may update the access control and service control of the mobile station or confirm the effect of the software update. At this time, the content contained in the SCI report sent by the SCA to the SCS may be only the confirmation information about the effect of the software update between the SCA and the SCS.

Figure 8:
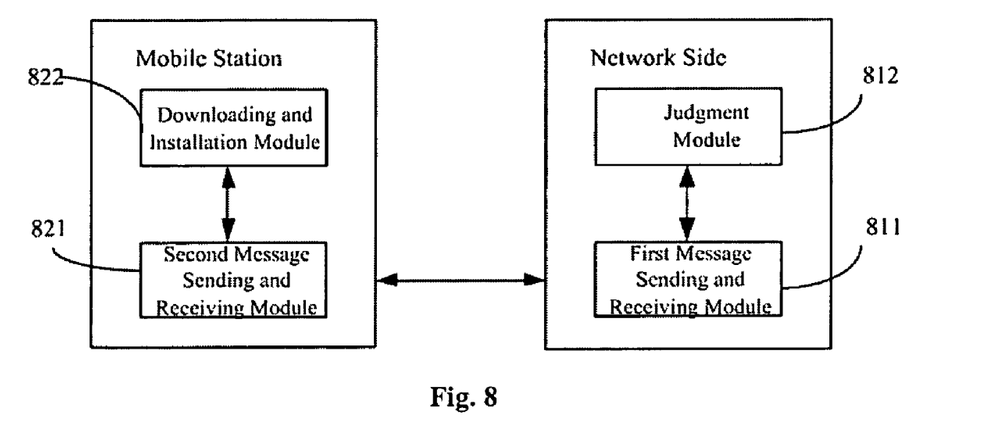
FIG. 8 is a block diagram showing a correlative reacting system according to another embodiment of the present invention.

As shown in FIG. 8, the correlative reacting system according to another embodiment of the present invention includes a network side and a mobile station.

The network side includes a first message sending and receiving module 811 and a judgment module 812. The first message sending and receiving module 811 is adapted to send a security correlative agent probe request to the mobile station, and receive a probe response sent by the mobile station. The judgment module 812 is adapted to determine whether the mobile station should install a security correlative agent according to the probe response.

The mobile station includes a second message sending and receiving module 821 which is adapted to receive the security correlative agent probe request and send the probe response to the network side.

The mobile station also includes a downloading and installation module 822 which is adapted to download and install a security correlative agent when the judgment module determines that the mobile station needs to install the security correlative agent.

The first message sending and receiving module 811 and the judgment module 812 may be in a network access controller or a security correlative server.

The correlative reacting system according to the embodiments of the present invention may be applicable to various mobile networks, such as GSM, CDMA, Wideband Code Division Multiple Access (WCDMA), TD-SCDMA, CDMA 2000 and WLAN, etc. The mobile station may be a mobile telephone or a Personal Digital Assistant (PDA) connected and communicated with a mobile network via an air interface, etc.

The above described are only the preferred embodiments of the present invention which should not be considered as a limitation to the present invention. Any modification, equivalent alteration and improvement should be encompassed in the protection scope of the present invention provided that they fall within the spirit and scope of the present invention.

What is claimed is:

1. A correlative reacting system, performing an information interaction with a mobile station, and comprising:
   a security correlative server;
   a network access controller; and
   an application service controller connected with the security correlative server, wherein the network access controller or the security correlative server is adapted to:
   send to the mobile station a security correlative agent probe request containing initialization configuration information of a security correlative agent for collecting and reporting security correlative information of the mobile station, to determine whether the mobile station needs to install the security correlative agent; and
   if a number of sent security correlative agent probe requests is greater than a threshold for sending the security correlative agent probe request, the security correlative server determines that it is necessary to install the security correlative agent in the mobile device.

2. The system according to claim 1, wherein the network access controller is adapted to send a mobile station connect report to the security correlative server.

3. The system according to claim 1, further comprising a security correlative agent downloading server which is adapted to provide the mobile station with a service for downloading the security correlative agent after the network access controller redirects a data service request of the mobile station.

4. The system according to claim 1, wherein the security correlative agent is located on a terminal side which is adapted to extract and save the initialization configuration information contained in the security correlative agent probe request and to return a security correlative agent probe response to the network access controller or the security correlative server.

5. The system according to claim 4, wherein the network access controller is adapted to receive a mobile station connect response sent by the security correlative server on determination that the mobile station needs to install the security correlative agent.

6. The system according to claim 1, wherein the security correlative agent is located at a terminal side which is adapted to collect security correlative information of the mobile station and report the security correlative information of the mobile station to the security correlative server of the correlative reacting system; and
   the security correlative server is adapted to analyze the security correlative information reported by the security correlative agent, and return a security correlative information response to the security correlative agent as required.

7. The system according to claim 6, wherein the network access controller and the application service controller are adapted to receive a security control policy update request delivered by the security correlative server when the security correlative server determines that the mobile station needs to install a security correlative agent according to an analysis result, and to return a security control policy update response to the security correlative server to notify the security correlative server an update result of the security control policy of the mobile station.

8. The system according to claim 4, further comprising a security condition report or a security prompt information generation unit, which is adapted to generate the security condition report or security prompt information of the mobile station according to the collected security correlative information of the mobile station and the security correlative information response returned by the security correlative server; the security condition report or security prompt information generation unit is in the security correlative agent.

9. The system according to claim 4, further comprising an update unit which is adapted to update a security application software or an operating system of the mobile station according to the security correlative information response returned by the security correlative server; the update unit is in the security correlative agent.

10. A correlative reacting system, comprising:
    a security correlative server;
    a network side; and
    a mobile station, wherein the network side comprises a first message sending and receiving module and a judgment module, the first message sending and receiving module being configured to send a security correlative agent probe request to the mobile station, and receive a probe response sent by the mobile station, and the judgment module is adapted to judge whether the mobile station needs to install a security correlative agent for collecting and reporting security correlative information of the mobile station according to the probe response; and
    the mobile station comprises a second message sending and receiving module which is adapted to receive the security correlative agent probe request and send the probe response to the network side;

if a number of sent security correlative agent probe requests is greater than a threshold for sending the security correlative agent probe request, the security correlative server determines that it is necessary to install the security correlative agent in the mobile device.

11. The system according to claim 10, wherein the mobile station further comprises a downloading and installation module which is adapted to download and install a security correlative agent when the judgment module determines that the mobile station needs to install the security correlative agent.

12. A method for implementing a security update of a mobile station, comprising:

sending, from a network access controller or a security correlative server of a correlative reacting system, to the mobile station, a security correlative agent probe request;

if a number of sent security correlative agent probe requests is greater than a threshold for sending the security correlative agent probe request, the security correlative server determines that it is necessary to install the security correlative agent in the mobile device;

the network side triggering the mobile station to start downloading and installation of the security correlative agent; and downloading and installing the security correlative agent into the mobile station.

13. The method according to claim 12, wherein when the mobile station does not respond to the security correlative agent probe request the network side does not receive a probe response from the mobile station within a preset time, or the times of sending the security correlative agent probe request by the network side exceed a preset threshold.

14. The method according to claim 12, further comprising: when the security correlative agent is installed in the mobile station and operates normally, extracting and saving, by the security correlative agent, initialization configuration information contained in the security correlative agent probe request and returning a security correlative agent probe response to the network side.

15. The method according to claim 14, wherein the security correlative agent probe response comprises notification information notifying that there is no need for the mobile station to install the security correlative agent, and information of an identity and/or an IP address of the security correlative agent.

16. The method according to claim 12, wherein, before the step of sending, from a network side comprising a network access controller or a security correlative server of a correlative reacting system, to the mobile station a security correlative agent probe request, the method further comprises:

the network access controller of the correlative reacting system sending a mobile station connect report to the security correlative server.

17. The method according to claim 12, wherein when determining that the mobile station needs to install a security correlative agent, the security correlative server sends a mobile station connect response to the network access controller to notify the network access controller that the mobile station needs to install the security correlative agent.

18. The method according to claim 12, wherein the step of downloading and installing the security correlative agent into the mobile station comprises:

receiving, by the network access controller of the correlative reacting system, a data service request from the mobile station, and redirecting, by the network access controller of the correlative reacting system, the data service request to an address for downloading the security correlative agent; and downloading and installing, by the mobile station, the corresponding security correlative agent according to the address for downloading the security correlative agent.

19. The method according to claim 18, wherein upon receiving by the network access controller of the correlative reacting system a data service request from the mobile station, if the mobile station has not finished the downloading of the security correlative agent or the network access controller does not know that the mobile station needs to install the security correlative agent, the network access controller performs a security processing on the data service request of the mobile station.

20. The method according to claim 12, wherein a destination address of the security correlative agent probe request is an IP unicast address or multicast address of the mobile station; the initialization configuration information comprises an IP address or a service port of the security correlative server.

21. A method for implementing a security update of a mobile station, comprising:

a security correlative agent of a correlative reacting system at a terminal side collecting security correlative information of the mobile station and reporting the security correlative information of the mobile station to a security correlative server of the correlative reacting system; and the security correlative server sending a security correlative agent probe request and analyzing the security correlative information reported by the security correlative agent, and returning a security correlative information response to the security correlative agent to provide security control information;

if a number of sent security correlative agent probe requests is greater than a threshold for sending the security correlative agent probe request, the security correlative server determines that it is necessary to install the security correlative agent in the mobile device.

22. The method according to claim 21, wherein the step of the security correlative agent of the correlative reacting system at the terminal side collecting the security correlative information of the mobile station comprises:

the security correlative agent collecting the security correlative information of the mobile station via a software interface of the mobile station;

the security correlative agent arranging the security correlative information, selecting information content to be reported to the security correlative server; and the step of reporting security correlative information of the mobile station to the security correlative server of the correlative reacting system comprises: the security correlative agent sending a security correlative information report containing the selected information content to the security correlative server via a secure information transmission channel between the security correlative server and the security correlative agent.

23. The method according to claim 21, wherein the step of the security correlative server analyzing the security correlative information reported by the security correlative agent and returning a security correlative information response to the security correlative agent as required comprises:

the security correlative server checking the validity of the security correlative information reported by the security correlative agent, performing a correlation analysis on the security correlative information, and updating the locally stored security correlative information of the mobile station according to a result of the correlation analysis; and the security correlative server returning a security correlative information response to the security correlative agent via a secure information transmission channel between the security correlative server and the security correlative agent according to the result of the correlation analysis, wherein the security correlative information response comprises security control information and an evaluation result of security level of the mobile station fed back by the security correlative server to the security correlative agent.

24. The method according to claim 21, further comprising: the security correlative agent saving latest security correlative information of the mobile station, content of security correlative information report and policy of security correlative information report.

25. The method according to claim 21, further comprising: the security correlative agent generating a security condition report or security prompt information of the mobile station according to the collected security correlative information of the mobile station and the security correlative information response returned by the security correlative server.

26. The method according to claim 21, further comprising: the security correlative agent updating a security application software of the mobile station or making a patch to the operating system/platform according to the security correlative information response returned by the security correlative server.

27. A method for implementing a security update of a mobile station, comprising:

a security correlative agent of a correlative reacting system at a terminal side collecting security correlative information of the mobile station and reporting the security correlative information of the mobile station to a security correlative server of the correlative reacting system;

the security correlative server sending a security correlative agent probe request and analyzing the security correlative information reported by the security correlative agent, and returning control information to the security correlative agent when an insecurity factor is present in the mobile station; and the security correlative agent assisting the mobile station in fixing the insecurity factor according to the control information;

if a number of sent security correlative agent probe requests is greater than a threshold for sending the security correlative agent probe request, the security correlative server determines that it is necessary to install the security correlative agent in the mobile device.

28. The method according to claim 27, wherein the step of assisting the mobile station in fixing the insecurity factor according to the control information is implemented in a period preset by the network side.

29. A method for implementing a security update of a mobile station, comprising:

a security correlative agent of a correlative reacting system at a terminal side collecting security correlative information of the mobile station and reporting the security correlative information of the mobile station to a security correlative server of the correlative reacting system;

the security correlative server sending a security correlative agent probe request and analyzing the security correlative information reported by the security correlative agent, and returning control information to the security correlative agent; and the mobile station downloading a software to implement an automatic update of the security correlative agent according to the control information;

if a number of sent security correlative agent probe requests is greater than a threshold for sending the security correlative agent probe request, the security correlative server determines that it is necessary to install the security correlative agent in the mobile device.

30. The method according to claim 29, further comprising: when the automatic update of the security correlative agent results in a limitation of a user's service, the security correlative agent notifies the user of the service limitation.

31. A method for implementing a security update of a mobile station, comprising:

sending a security correlative agent probe request to the mobile station from a security correlative server; if a number of sent security correlative agent probe requests is greater than a threshold for sending the security correlative agent probe request, the security correlative server determines that it is necessary to install the security correlative agent in the mobile device, and triggering the mobile station to start downloading and installation of the security correlative agent to implement a security update.

* * * * *